(12) United States Patent
Miyashita et al.

(10) Patent No.: US 6,813,326 B1
(45) Date of Patent: Nov. 2, 2004

(54) DATA TRANSMISSION SYSTEM, DATA TRANSMISSION COMMUNICATION STATION, AND DATA TRANSMISSION METHOD

(75) Inventors: Atsushi Miyashita, Tokorozawa (JP); Toshiyuki Akiyama, Tokorozawa (JP); Seiichi Sano, Higashiyamato (JP); Hisao Koda, Musashimurayama (JP); Itsuo Ishida, Sayama (JP); Hiroyuki Takesue, Kodaira (JP); Tatsuhiro Nakada, Kodaira (JP); Nobuo Tsukamoto, Akishima (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/394,276

(22) Filed: Sep. 10, 1999

(30) Foreign Application Priority Data

Sep. 11, 1998 (JP) .......................................... 10-259016

(51) Int. Cl.[7] ................................................ H04L 7/04
(52) U.S. Cl. ........................ 375/362; 375/219; 375/259
(58) Field of Search ................................. 375/211, 275, 375/219, 259, 260, 295, 254, 362, 364, 371, 373, 376; 370/491, 492, 500, 501, 503, 522

(56) References Cited

U.S. PATENT DOCUMENTS

| 4,837,786 A | | 6/1989 | Gurantz et al. ............. 370/206 |
|---|---|---|---|
| 5,339,184 A | * | 8/1994 | Tang ........................... 359/124 |
| 5,408,686 A | * | 4/1995 | Mankovitz .................... 455/66 |
| 5,796,783 A | | 8/1998 | Crawford ..................... 375/298 |
| 5,818,653 A | * | 10/1998 | Park et al. ..................... 360/32 |
| 5,844,939 A | * | 12/1998 | Scherer et al. .............. 375/219 |
| 6,091,702 A | * | 7/2000 | Saiki .......................... 370/203 |

FOREIGN PATENT DOCUMENTS

| JP | 5636242 | 4/1981 |
|---|---|---|
| JP | 851408 | 2/1996 |
| JP | 8265293 | 10/1996 |
| WO | 9708861 | 3/1997 |

* cited by examiner

Primary Examiner—Chieh M. Fan
(74) Attorney, Agent, or Firm—Antonelli, Terry, Stout & Kraus, LLP

(57) ABSTRACT

A data transmission system for transmitting data from a transmitter to a receiver located away therefrom. The transmitter includes circuitry for transmitting together a main signal having a carrier modulated with main data to be transmitted and as well as a sub-signal to be used in frequency conversion and generated by modulating a carrier of a predetermined frequency out of a frequency band of the main signal. The receiver includes circuitry for receiving a receive signal from the transmitter and extracting the sub-signal therefrom and also includes circuitry for generating a signal to be used as a reference at the time of converting the receive signal to a signal having a predetermined frequency on the basis of the extracted sub-signal.

4 Claims, 9 Drawing Sheets

DATA TRANSMISSION SYSTEM, DATA TRANSMISSION COMMUNICATION STATION, AND DATA TRANSMISSION METHOD

BACKGROUND OF THE INVENTION

The present invention relates to a data transmission system, a communication station and a data transmission method and more particularly, to a communication technology which is suitable when digital signal data is transmitted between communication stations located away from each other in the form of microwave. Data to be transmitted include television signals of digital and analog types and other types of information. Explanation will be made below as to a general arrangement of a transmission system for transmitting data with use of high frequencies of about 1 GHz or more.

A transmission side once performs baseband modulation over input data to obtain a signal subjected to the baseband modulation, and creates a signal Sit having an intermediate frequency from the baseband-modulated signal. And the transmission side eventually creates a signal Sht having a final radio frequency (RF) after subjected to an up-conversion, and transmits the radio-frequency signal Sht. A receiver side, on the other hand, converts a radio-frequency signal Shr received and amplified in a similar manner to in the transmission side to a frequency down-conversion to obtain a signal Sir having an intermediate frequency, and then subjects the signal Sir to a baseband demodulation.

An example of a transmission system having a prior art arrangement is shown in FIG. 7.

In the transmission side, a baseband modulator 1 converts main data (to be transmitted) received from a terminal 22 to the signal Sit of the intermediate frequency on the basis of a clock CK2 of a frequency f2 received from an oscillator (OSC) 9B. In the illustrated example, the frequency fit of the signal Sit is related to the frequency f2 of the clock CK2. In other words, an accuracy in the frequency fit of the signal Sit depends on an accuracy in the frequency f2 of the clock CK2.

A frequency converter 3 converts with respect to frequency the signal Sit of the intermediate frequency fit to the signal Sht of the radio-frequency fht on the basis of a frequency f1 of a clock CK1 received from an oscillator (OSC) 9 as a reference frequency.

A power amplifier 4 amplifies the signal Sht to such an level that the signal Sht can have a predetermined transmission power, and transmits the power-amplified radio-frequency transmission signal from an antenna 5 toward an antenna 10 on the receiver side.

In the receiver side, a preamplifier 13 outputs a received signal as the radio-frequency-amplified signal Shr. A frequency converter 11 down-converts the signal Shr to the signal Sir of an intermediate frequency fir on the basis of a frequency f3 of a clock CK3 received from an oscillator (OSC) 9C as a reference frequency. In the illustrated example, a frequency shift in the oscillator (OSC) 9C is related to a frequency shift in the signal Sir of the intermediate frequency.

A baseband demodulator 12 demodulates the original main data from the signal Sir of the intermediate frequency on the basis of a frequency f4 of a clock CK4 received from oscillator (OSC) 9D as a reference frequency, and then outputs the demodulated data to a terminal 24.

The entire operation of the above system including the frequency conversion will now briefly explained with use of FIG. 8. It is assumed that the intermediate-frequency signal Sit on the transmission side has the frequency fit and the final radio-frequency signal Sht on the transmission side has the frequency fht. It is also assumed that the receive signal Shr on the receiver side has the frequency fhr and the intermediate-frequency signal Sir on the receiver side has the frequency fir.

In this case, the frequency conversion is carried out by multiplying the clock CK1 corresponding to the frequency difference f1 between the frequency fit and the reference frequency fht of the transmission side by the signal Sit.

This results in generation of the signal Sht of the frequency fht obtained by adding the frequency fit to the frequency f1 as well as generation of a signal S'ht of a frequency f'ht obtained by subtracting the frequency fit from the frequency f1.

A specific example of how to obtain an final output frequency of 1.82 GHz will be explained below.

When fit=20 MHz and f1=1.8 GHz, output signals having frequencies of 1.82 GHz and 1.78 GHz are obtained. In this case, one of the output signals having the frequency of 1.78 GHz is removed by a filter and only the signal of the frequency of 1.82 GHz is used as a transmission signal.

Such a prior art arrangement as mentioned above has a practical problem that, even when the oscillators (OSC's) 9 and 9C located as separated into the transmission and receiver sides are each of a high-accuracy crystal resonator type, differences in temperature characteristic, etc. between the oscillators causes the oscillation frequencies of the oscillators not to become exactly the same, because the oscillators are asynchronous, thus resulting more or less in a frequency difference.

As mentioned above, the intermediate-frequency signal Sit is up-converted by the frequency converter 3 of the transmission side to the radio-frequency signal Sht and is down-converted by the frequency converter 11 of the receiver side to the intermediate-frequency signal Sir.

At this time, if the frequency f1 of the oscillator (OSC) 9 coincides with the frequency f3 of the oscillator (OSC) 9C, then the frequency fit of the signal Sit of the transmission side coincides with the frequency fir of the signal Sir of the receiver side. However, due to the aforementioned frequency difference, since the signal Sir has such a frequency shift as mentioned above in the baseband demodulator 12 of the receiver side, the original main data cannot be normally demodulated.

In the case of ground wave digital TV broadcasting using an orthogonal frequency division multiplex (OFDM) system for example, a baseband modulating and demodulating system uses about 6,000 multicarriers having an interval of about 1 KHz. Thus when there exists 1 KHz or more of accuracy lack, in particular, in the frequency conversion of the receiver side, this will involve great influence such as difficult normal demodulation.

In the case of OFDM wave used in the ground wave digital TV broadcasing, there is a pilot signal interpolation system wherein some of multicarriers are used as frequency references in transmission and receiver sides. A technique for interpolating a pilot signal in an OFDM signal is disclosed in "Development of the OFDM Modem", Kisoda. et al., Technical Report of The Institute of Image Information and Television Engineers, Aug. 26, 1997, pp. 13–18.

However, the pilot signal interpolation system has its limit in synchronizable range. In particular, when signals of an UHF band are frequency-converted to signals of a microwave band as a transmission band and converted again to signals of the UHF band in the receiver side, the frequency shift becomes great.

In this case, the accuracy of the oscillator is defined by ppm. For example, even when the oscillators of the transmission and receiver sides have each an accuracy of 1 ppm, a frequency error between the transmission and receiver sides is 7 KHz for a transmission band of 7 GHz and is about 800 Hz for a transmission band of 800 MHz.

Accordingly when frequency conversion is carried out from the UHF band to the microwave band, an error caused by the up-conversion/down-conversion of at the transmission/receiver side is increased to about 10 times an error of the frequency conversion in UHF band, which causes a great harm in the entire baseband demodulating operation based on the pilot signal interpolation system.

Further, even when the frequency shift is suppressed to such a level as to cause no influence on the baseband demodulation, the frequency error to be transmitted in broadcasting applications is restricted to an accurate range of several tens of Hz.

For this reason, an arrangement of provision of accurate and highly expensive oscillators of rubidium or the like in the respective frequency converters in the transmission and receiver sides has had to be employed for the broadcasting applications.

Further, in addition to the problem of oscillator frequency fluctuations, the data transmission system has a problem that there must be provided a private line for maintenance contact or control signal which is to be used by a radio facility manager, in addition to the main data transmission line.

More specifically, there are transmission requests which include a digitized voice signal for contact between the transmission and receiver sides and control data for control of devices in the receiver or relay stations. In order to meet such a demand, it is indispensable as a practical matter to secure a special channel for the control data in addition to the main data line.

For example, portable phones spread in these years, but relay or transmission points of the phones are often positioned out of their speech enable areas, which requires provision of additional radio channel exclusive for maintenance contact and control signals. In reality, however, it is practically impossible to provide such radio channels as contactable with all the relay and transmission points.

There is also considered a method for inserting contact information in part of the aforementioned main data (such as a vertical blanking period having VITC (Vertical Interval Time Code) or the like embedded therein in an analog system) in the data transmission. In this method, however, when it is desired to make a separate contact from a first relay point to a second relay point, it becomes highly troublesome to exchange detailed contact information.

More specifically, in order to interchange information inserted in the main data, it is necessary to demodulate the main data up to its baseband, interchange part thereof for other data, and then re-modulate it. This involves generation of a processing delay time. Accordingly it is impossible to interchange the partial data during use of the main data as ordinary broadcasting data.

SUMMARY OF THE INVENTION

It is therefore an object of the present invention to solve the problems in the prior art, enable elimination of a frequency shift even when an inexpensive oscillator is used and normal demodulation of predetermined data, and also enable transmission of other data in addition to the predetermined data.

In a data transmission system in accordance with the present invention, a transmission side adds to a main signal a sub-signal having a frequency out of a frequency band of the main signal as frequency conversion information and transmits the composite signal including the sub-signal and the main signal, whereas, a receiver side extracts the added sub-signal from the received composite signal to make a frequency conversion reference for demodulation of the main signal coincide with that of the transmission side. At the same time, the transmission side modulates the sub-signal to be added with sub-data and also transmits it, while the receiver side demodulates the sub-data.

DESCRIPTION OF THE EMBODIMENTS

Figure 2:
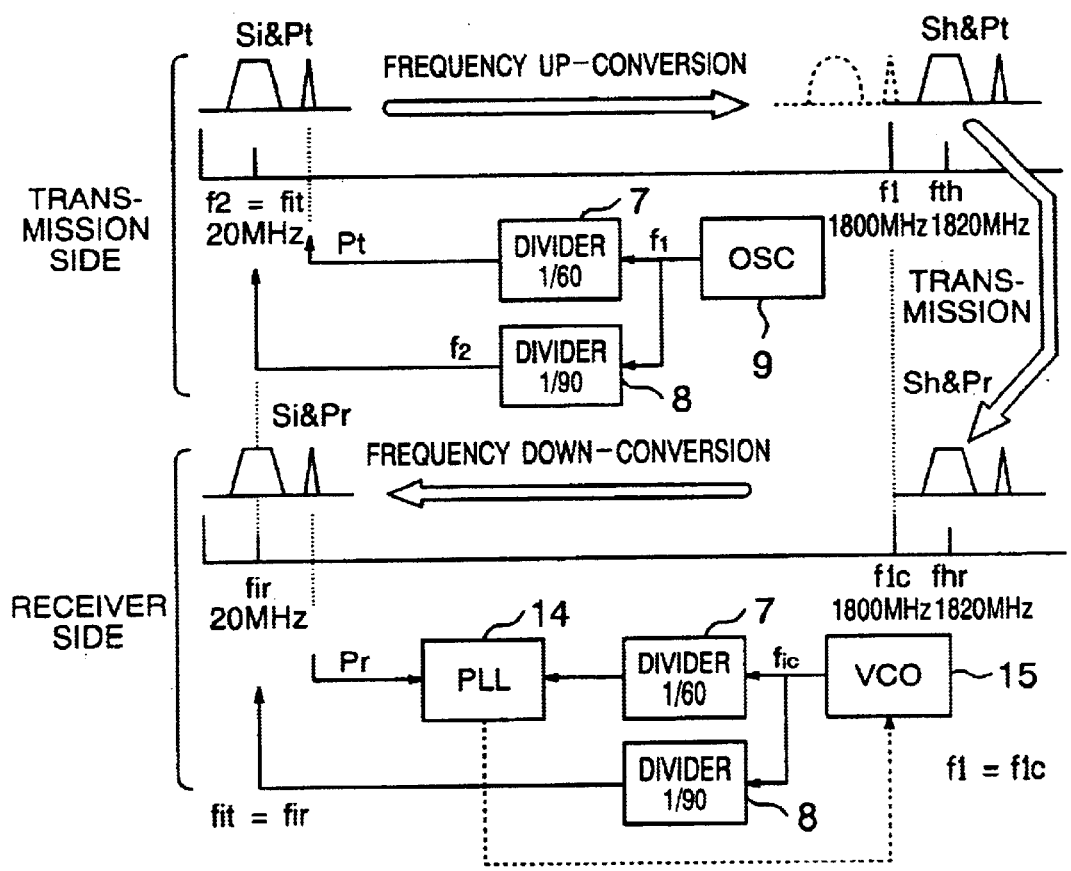
FIG. 2 is a diagram for explaining the basic operation of the data transmission system of the present invention.

The basic operation of a data transmission system of the present invention as an example will be explained with reference to FIG. 2.

In a transmission side, a main signal Sit subjected to a baseband modulation is created based on a reference clock (for example, having a frequency f2 of 20 MHz obtained by frequency-dividing a signal having a frequency f1 of, e.g., 1,800 MHz from an oscillator (OSC) 9 by, e.g., 90) for the baseband modulation.

Also previously added to the main signal Sit is a pilot signal (sub-signal) Pt obtained by frequency-dividing the signal of the frequency f1 (of 1,800 MHz) from the OSC 9 by, e.g., 60. And a signal Si&Pt having the added pilot signal Pt is up-converted to a signal Sh&Pt of a frequency of 1,820 and then transmitted.

A receive signal Sh&Pr amplified in a receiver side is down-converted based on an output of a voltage-controlled oscillator (VCO) 15 into a signal Si&Pr. And a pilot signal Pr is extracted from the signal Si&Pr, and compared with a result obtained by frequency-dividing the output of the VCO 15 by 60 to correct an frequency f1c of the output of the VCO 15.

That is, since control is carried out in such a manner that the frequency f1 of the OSC 9 in the transmission side becomes equal to the frequency f1c of the VCO 15 in the receiver side, the frequency of the signal Si&Pt of the transmission side is also equal to the frequency of the signal Si&Pr of the receiver side. In this connection, if there is a frequency shift but the pilot signal is set to have a frequency located out of the band of a main data modulated wave, the pilot signal can be instantly discriminated from the main data modulated wave.

Since a non-modulated pilot signal sometimes adversely affects other communication, it may be legally restricted. To avoid this, the pilot signal is used as modulated. Sub-data for modulation of the pilot signal Pt are considered to include digitized audio signal data for contact and control data for control of devices in signal receiver and relay stations.

In this way, the modulation of the pilot signal with the sub-data can realize a transmission system which can transmit the sub-data while eliminating the need for provision of an additional channel exclusive to transmit the sub-data.

Figure 1:
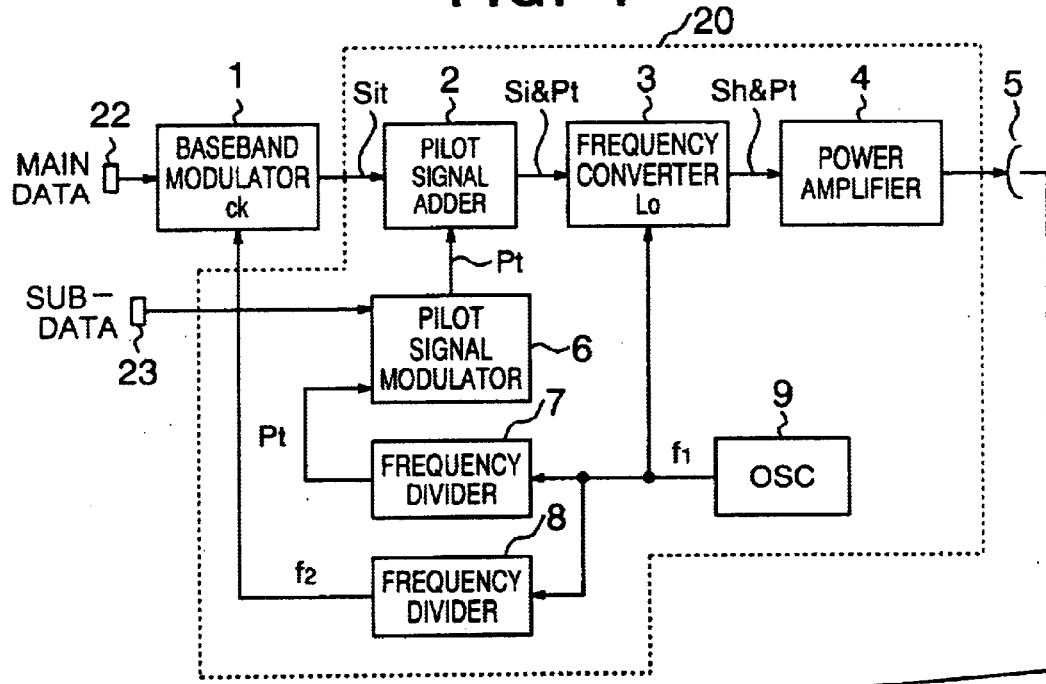
FIG. 1 is a block diagram of an entire arrangement of an embodiment of a data transmission system in accordance with the present invention.
Figure 1:
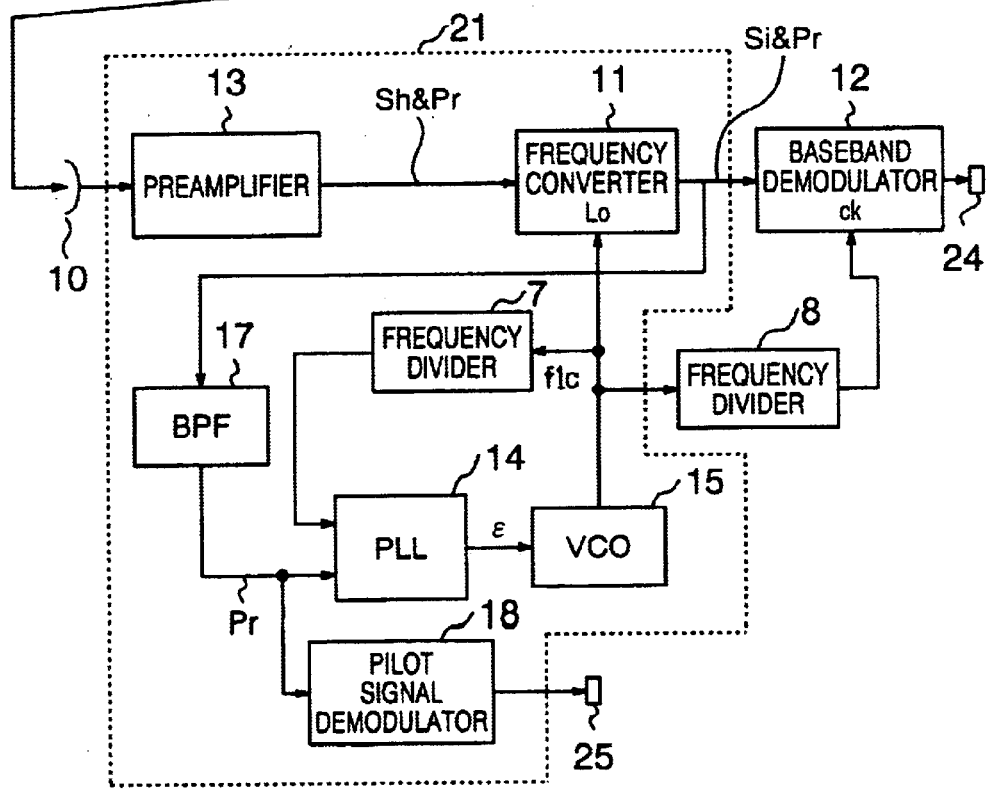

FIG. 1 shows a block diagram of an entire arrangement of an embodiment of the data transmission system in accordance with the present invention, which will be detailed below.

Figure 7:
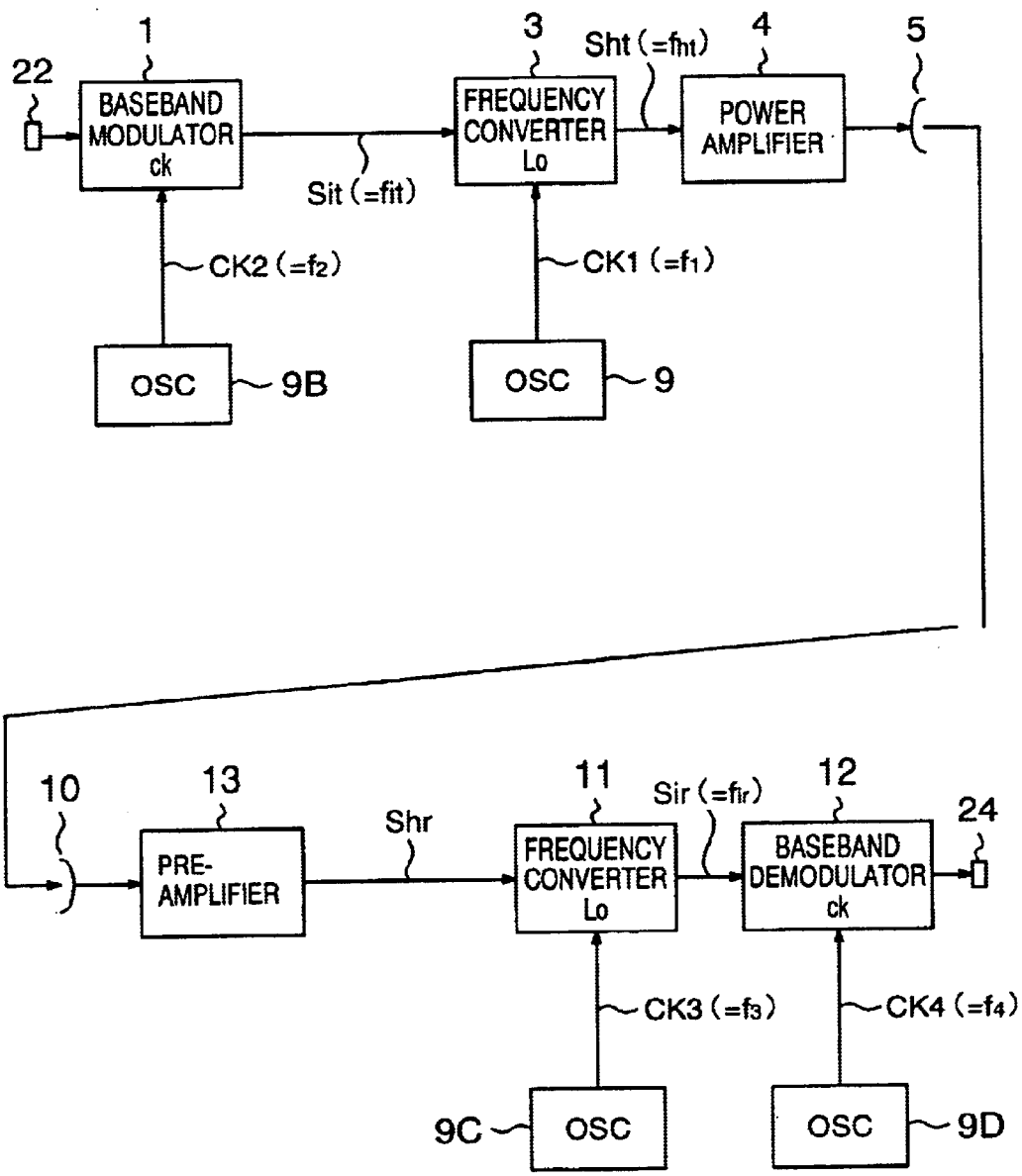
FIG. 7 is a block diagram of an entire arrangement of a general data transmission system.
Figure 8:
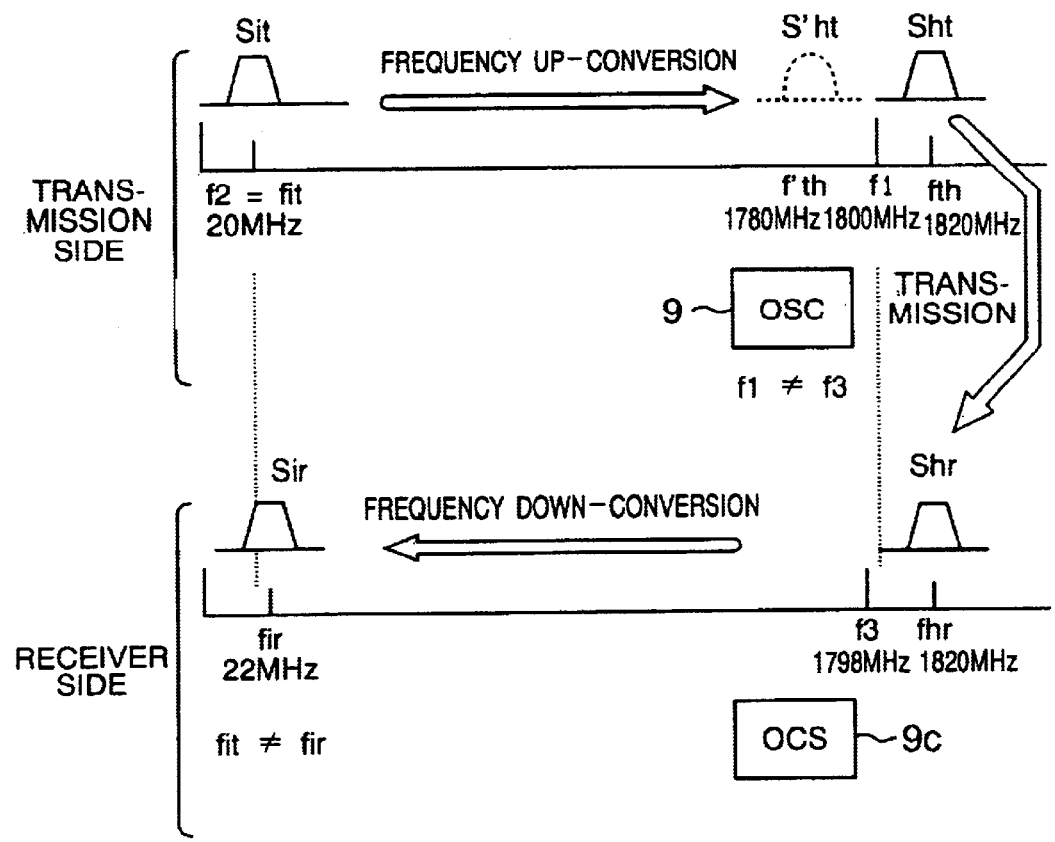
FIG. 8 is a diagram for explaining the basic operation of the data transmission system of FIG. 7.

A transmitter basic section 20, similarly to FIG. 7, includes a baseband modulator 1, a frequency converter 3, a power amplifier 4, an antenna 5 and an oscillator (OSC) 9. The transmitter basic section 20 also includes a pilot signal adder 2, a pilot signal modulator 6, and frequency dividers 7 and 8 which form a featured part of the present invention.

An output of the oscillator (OSC) 9 is connected to a terminal Lo of the frequency converter 3 and the frequency dividers 7 and 8. An output of the frequency divider 7 is sent to the pilot signal adder 2 via the pilot signal modulator 6 as a pilot signal Pt to be used as a reference of frequency conversion in the transmitter basic section 20.

Sub-data received from a terminal 23 is applied to the pilot signal modulator 6. In this connection, the sub-data are considered to include digitized voice signal data for contact between the transmission and receiver sides and control data for control of devices in signal receiver and relay stations.

An output of the frequency divider 8 is applied to the baseband modulator 1 as a reference clock of the transmitter basic section 20.

A receiver basic section 21, on the other hand, includes, similarly to FIG. 7, a preamplifier 13, a frequency converter 11 and a baseband demodulator 12. The receiver basic section 21 further include a pilot signal demodulator 18, frequency dividers 7 and 8, a phase locked loop (PLL) 14, a voltage-controlled oscillator (VCO) 15 and a bandpass filter (BPF) 17, which form a featured part of the present invention.

An output of the VCO 15 is applied to the frequency dividers 7 and 8. An output of the frequency divider 7 is applied to the PLL 14. An output of the frequency converter 11 is applied to the baseband demodulator 12 and BPF 17. An output of the BPF 17 is applied to the other input of the PLL 14 and to the pilot signal demodulator 18. An output ∈ of the PLL 14 is connected to a control terminal of the VCO 15.

The processing operations of the parts of the data transmission system of FIG. 1 will be explained by referring also to FIG. 2.

The frequency f2 (of, e.g., 20 MHz obtained by frequency-dividing the output (having the frequency f1 of, e.g., 1,800 MHz) of the OSC 9 by, e.g., 90) of the frequency divider 8 is used as a frequency reference in the baseband modulation. As a result, a modulated signal Sit having a frequency of 20 MHz is created by the baseband modulator 1. The output of the OSC 9 is frequency-divided by, e.g., 60 in the frequency divider 7 into a pilot signal Pt of a frequency of 30 MHz modulated with the sub-data.

The pilot signal adder 2 adds together the signal Sit modulated with the main data and the pilot signal Pt modulated with the sub-data to generate a signal Si&Pt, and then outputs the signal Si&Pt.

The frequency converter 3 up-converts the signal Si&Pt to a signal Sh&Pt having a radio frequency of, e.g., 1,820 MHz.

The radio-frequency signal Sh&Pt is transmitted from the transmission side to the receiver side, and amplified by the preamplifier 13 of the receiver side to a signal Sh&Pr. And the signal Sh&Pr is frequency-converted by the frequency converter 11 to a signal Si&Pr having an intermediate frequency. The signal Si&Pr contains a component corresponding to the sender-side signal Sit of 20 MHz modulated with the main data and a component corresponding to the pilot signal Pr of 30 MHz modulated with the sub-data.

In this case, when the frequency f1c of the VCO 15 is not equal to the frequency f1 of the OSC 9 of the transmission side, the main data and sub-data subjected to the frequency conversion both do not have carrier frequencies of 20 MHz and 30 MHz respectively, thus generating a frequency shift corresponding to a difference between the frequencies f1 and f1c.

The BPF 17, by utilizing the frequency difference, extracts the pilot signal Pr component of about 30 MHz from the composite signal Si&Pr of the intermediate frequency. The PLL 14 compares the frequency of the extracted pilot signal Pr component with a frequency obtained by dividing the output frequency of the VCO 15 by 60, and controls the frequency f1c of the VCO 15 in such a manner that the both frequencies become equal.

Now explanation will be made below as to a relationship between the frequency of the extracted pilot signal Pr down-converted by the frequency converter 11 and the frequency of the signal obtained by frequency-dividing the output of the VCO 15 by 60.

For example, when the oscillation frequency f1c of the VCO 15 is initially 1,803 MHz, a frequency obtained by frequency-dividing the oscillation frequency f1c of the VCO 15 by 60 is 30.05 MHz (=f1c/60=1,803 MHz/60).

Meanwhile, the frequency of the extracted pilot signal Pr by subtracting the oscillation frequency f1c of the VCO 15 from a sum of the frequency f1 of the OSC 9 of the transmission side and the frequency (30 MHz) of the pilot signal Pt of the transmission side becomes 27 MHz (=f1+30 MHz−f1c=1,800 MHz+30 MHz−1,803 MHz).

In this case, the PLL 14 is controlled so that the oscillation frequency f1c of the VCO 15 decreases.

As a result, when the oscillation frequency f1c of the VCO 15 is fluctuated, for example, from 1,803 MHz to 1,801 MHz, the frequency obtained by frequency-dividing the oscillation frequency f1c of the VCO 15 by 60 becomes 30.017 MHz (=f1c/60=1,801 MHz/60).

Meanwhile, the frequency of the extracted pilot signal Pr becomes 29 MHz (=f1+30 MHz−f1c=1,800 MHz+30 MHz−1,801 MHz).

As a result of repetition of such control, when the oscillation frequency f1c of the VCO 15 is varied from 1,801

MHz to 1,800 MHz, the frequency obtained by frequency-dividing the frequency f1c by 60 becomes 30.00 MHz (=f1c/60=1,800 MHz/60).

Meanwhile, the frequency of the extracted pilot signal Pr becomes 30 MHz (=f1+30 MHz–f1c=1,800 MHz+30 MHz–1,800 MHz).

As a result, the frequency of the pilot signal Pr in the transmission side becomes equal to that in the receiver side, so that the reference frequency of the frequency down-conversion of the receiver side is controlled to be equal to the reference frequency of the frequency up-conversion of the transmission side, thus generating no frequency shift between the transmission and receiver sides. The pilot signal Pr extracted by the BPF 17 is supplied to the pilot signal demodulator 18 where the sub-data is demodulated therefrom and then output to a terminal 25.

Figure 3:
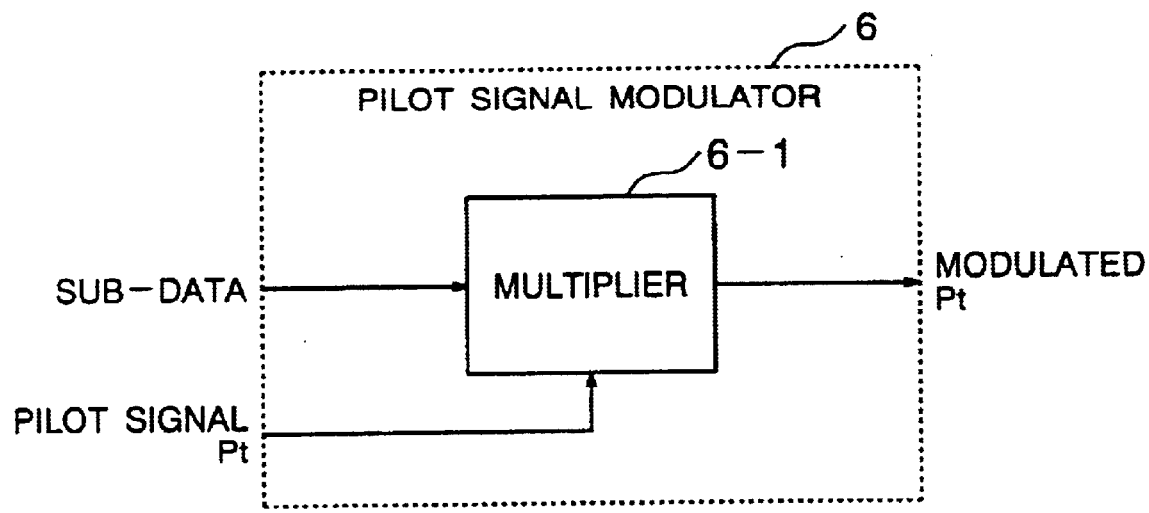
FIG. 3 is a block diagram of an example of a pilot signal modulator used in the data transmission system.

Explanation will next be made as to an example of the pilot signal modulator 6 of FIG. 3. Since the pilot signal is used as the frequency reference in the transmission side, the pilot signal modulator 6 is of a modulation type wherein a center of fluctuation frequencies of the pilot signal is fixed independently of contents of the sub-data. A simplest form of the modulation type is amplitude modulation.

A multiplier 6-1 multiplies the sub-data by the pilot signal to generate a pilot signal Pt modulated with the sub-data, and outputs the pilot signal Pr.

Figure 4:
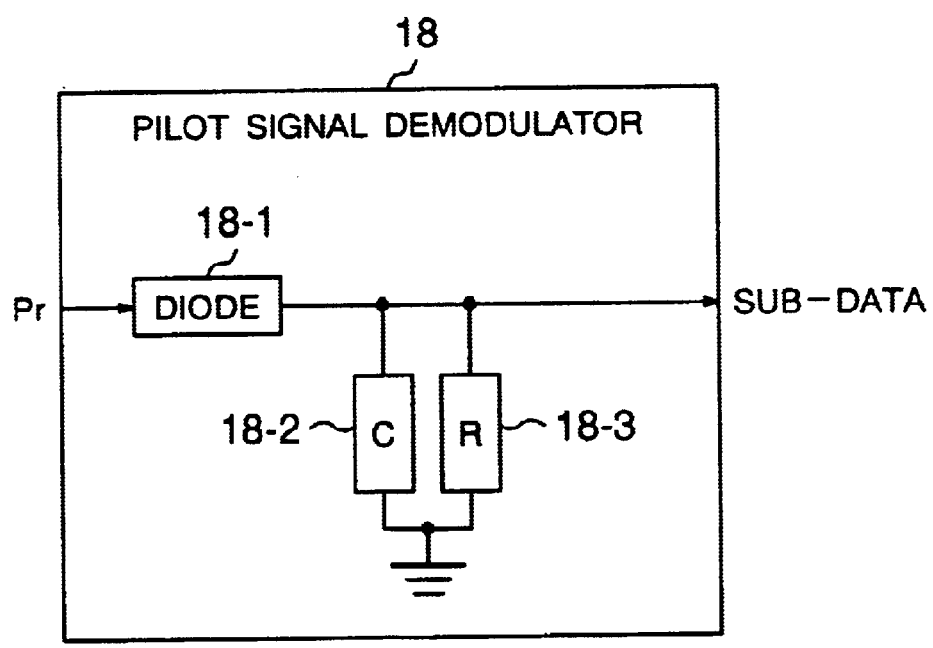
FIG. 4 is a block diagram of an example of a pilot signal demodulator used in the data transmission system.

Explanation will then be made as to an example of the pilot signal demodulator 18 of FIG. 4.

It goes without saying that the pilot signal demodulator 18 is of a demodulation type associated with the modulation type used in the transmission side. In the illustrated example, the demodulation type is amplitude demodulation.

In this case, since the pilot signal Pr is sent via a diode 18-1 to a capacitor 18-2 and a resistor 18-3 to be accumulated therein and discharged therefrom, an envelope of the sub-data can be reproduced and the sub-data can be demodulated.

As mentioned above, since a digitized voice signal for contact between the transmission and receiver sides as well as control data for control of devices in signal receiving and relay stations can be carried on the pilot signal as the sub-data, these signals can be transmitted while eliminating the need for provision of a private line or channel.

In this connection, when the sub-data is modulated at a high rate, the frequency fluctuation width of the pilot signal Pt is increased, for which reason it is necessary to restrict the modulation degree to such a level that will not interfere with the frequency band of the modulated main data signal Sit.

Figure 5:
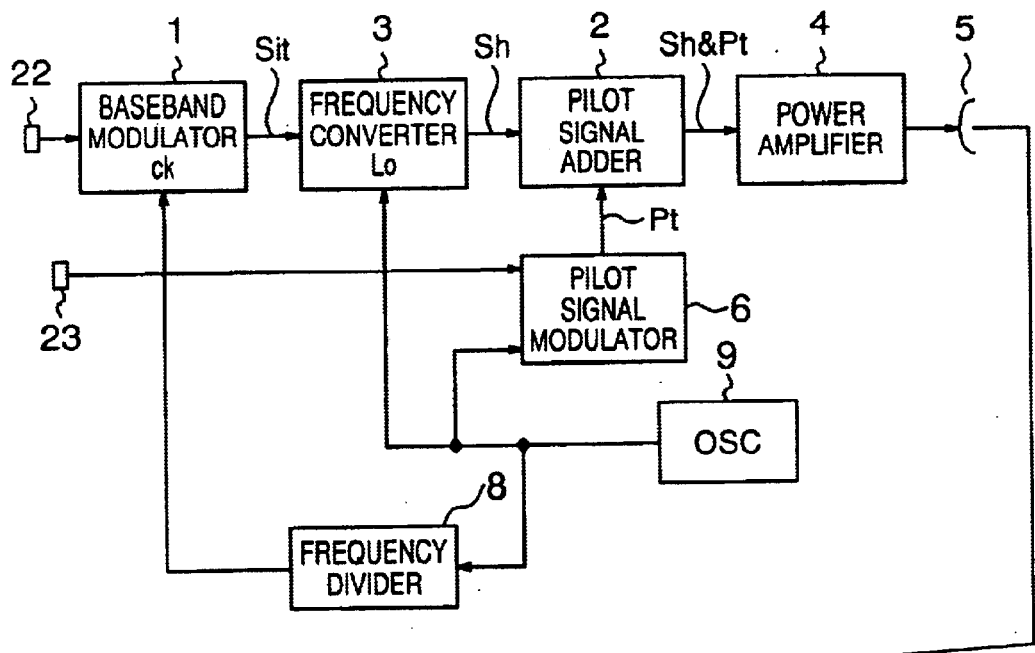
FIG. 5 is a block diagram of an entire arrangement of another embodiment of the data transmission system in accordance with the present invention.
Figure 5:
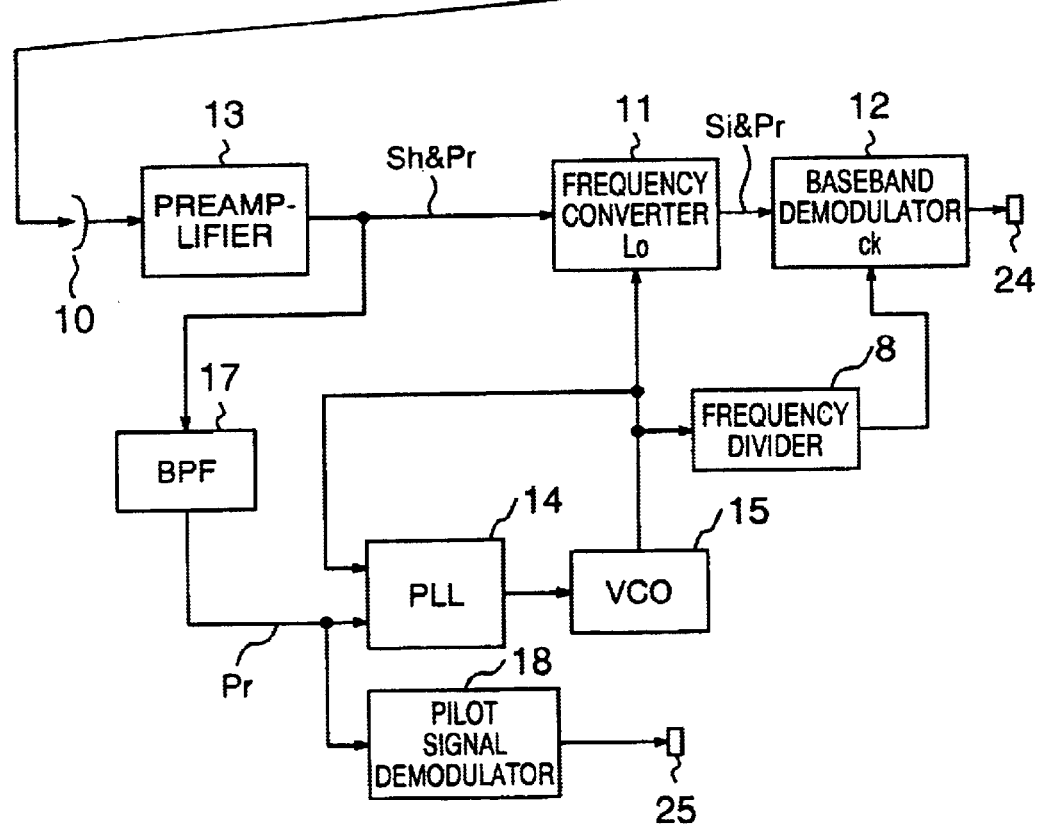

Another embodiment of the data transmission system in accordance with the present invention shown in FIG. 5 will be explained. This embodiment is arranged so that addition of the pilot signal in a transmission side is carried out after frequency up-conversion, while extraction of the pilot signal in a receiver side is carried out prior to frequency down-conversion.

In this case, accordingly, the outputs of the OSC's 9 and 15 can be directly used as the pilot signal and its comparison signal. In this case, however, it becomes necessary to provide a high-resolution filter for removing a signal f'h&Pt of a lower side band generated after the frequency up-conversion.

Figure 6:
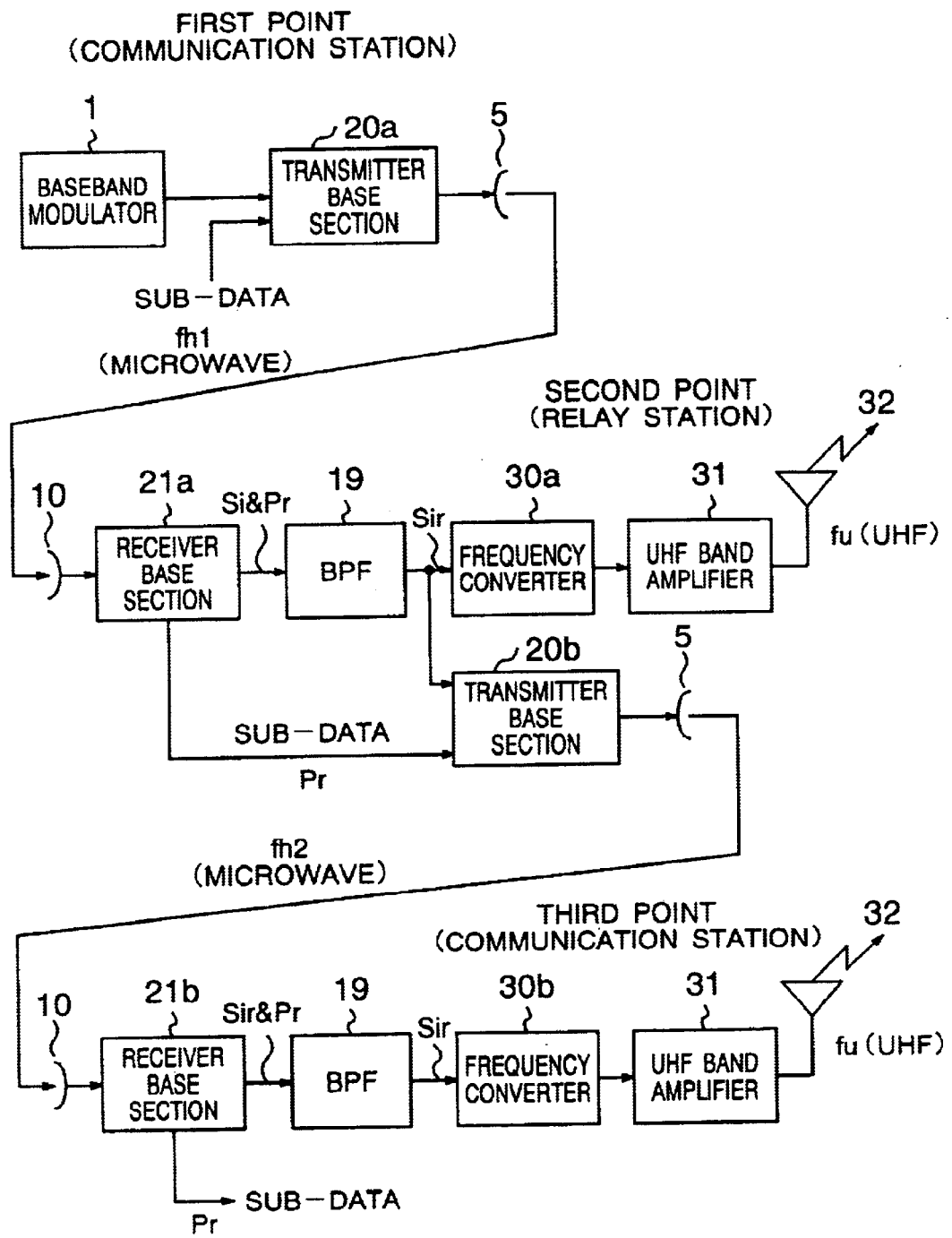
FIG. 6 is a block diagram of an entire arrangement of a signal relay system to which the data transmission system of the present invention is applied.

FIG. 6 shows an arrangement of a radio relay system having a plurality of relay points, to which the data transmission system of the present invention is applied.

In this system, a transmitter base section 20a located in a first point (a first communication station) transmits a send signal having a frequency fh1, whereas, a receiver base section 21a provided in a second point (a relay station as a second communication station) receives the signal of the frequency fh1 and converts it to a signal Si&Pr having an intermediate frequency.

The pilot signal Pr having a frequency out of the frequency band is removed by a BPF 19 from the signal Si&Pr to leave only the signal Sir having a frequency within the band. The signal Sir is provided to a transmitter base section 20b and a frequency converter 30a. The transmitter base section 20b adds the pilot signal Pr modulated with the sub-data to the signal Sir, converts it to a send signal having a frequency fh2, and then transmits the converted signal toward a third point (a third communication station), similarly to the above.

In the relay station at the second point, the signal Sir is converted to a signal having a UHF band frequency and power amplified by a UHF band amplifier 31, and only the main data subjected to the UHF band conversion is transmitted from an antenna 32 toward the periphery of the second point. UHF electromagnetic wave transmitted from the antenna 32 is received by the receivers of subscribers within a wave reach area.

At the third point, a received signal is frequency-converted by a receiver base section 21b to a signal Sir&Pr having an intermediate frequency, passed through a BPF 19 to obtain only the signal Sir, and then applied to a frequency converter 30b, similarly to the above. As in the second point, the signal Sir is converted by the frequency converter 30b to a signal having a UHF band frequency, power amplified by an UHF band amplifier 31, and then sent to a UHF band antenna 32 to transmit only the main data converted to the UHF band to the periphery of the second point. UHF electromagnetic wave transmitted from the antenna 32 is received by the receivers of subscribers within the wave reach area.

In this connection, if the contents of the sub-data is set identical for all relay points, information having the same contents can be delivered to the relay points. Further, when the contents of the sub-data is changed for each of the relay points, different information can be transmitted to the respective relay points.

Figure 9:
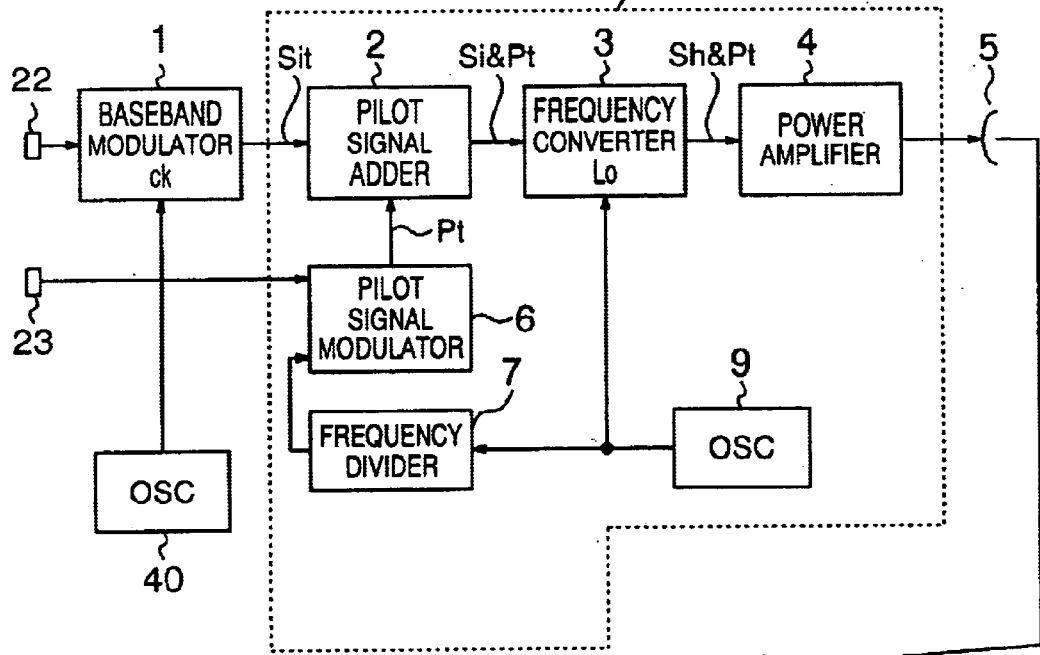
FIG. 9 is a block diagram of a further embodiment of the data transmission system in accordance with the present invention.
Figure 9:
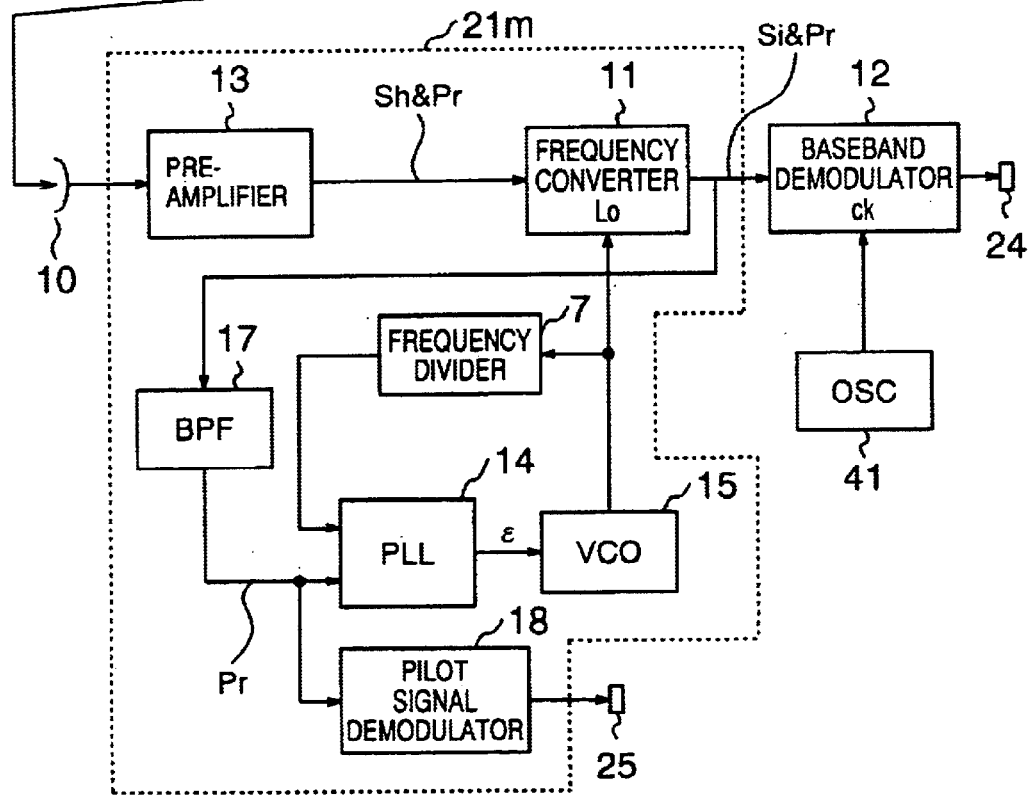

Shown in FIG. 9 is a block diagram of a further embodiment of the data transmission system in accordance with the present invention. The embodiment of FIG. 9 is basically the same as the embodiment of FIG. 1, except for the structures of the frequency divider and OSC. The same elements in FIG. 9 as those in FIG. 1 are denoted by the same reference numerals. In the embodiment of FIG. 9, a local oscillation signal for use in a baseband modulator 1 and a local oscillation signal for use in a frequency converter 3 are supplied from individual OSC's 40 and 9 respectively. Accordingly, the embodiment of FIG. 9 has no such a frequency divider 8 as used in the embodiment of FIG. 1. Reference symbol 20m denotes a transmitter basic section and symbol 21m denotes a receiver basic section. The transmitter and receiver basic sections 20m and 21m have basically the same functions as the transmitter and receiver basic sections 20 and 21.

The baseband modulator 1 converts an input signal to a signal having an intermediate frequency Sit according to a clock generated by the OSC 40. The baseband demodulator 12 converts an input signal having the intermediate frequency Sit to a signal of a baseband according to a clock generated by an OSC 41. In the absence of the frequency divider 8, an error in the OSC's 40 and 41 remains in an output of a receiver side. However, since the OSC's 40 and 41 generate the clocks having frequencies of several tens of MHz, even when the error is 1 ppm, a frequency difference therebetween is several Hz that is practically insignificant.

Figure 10:
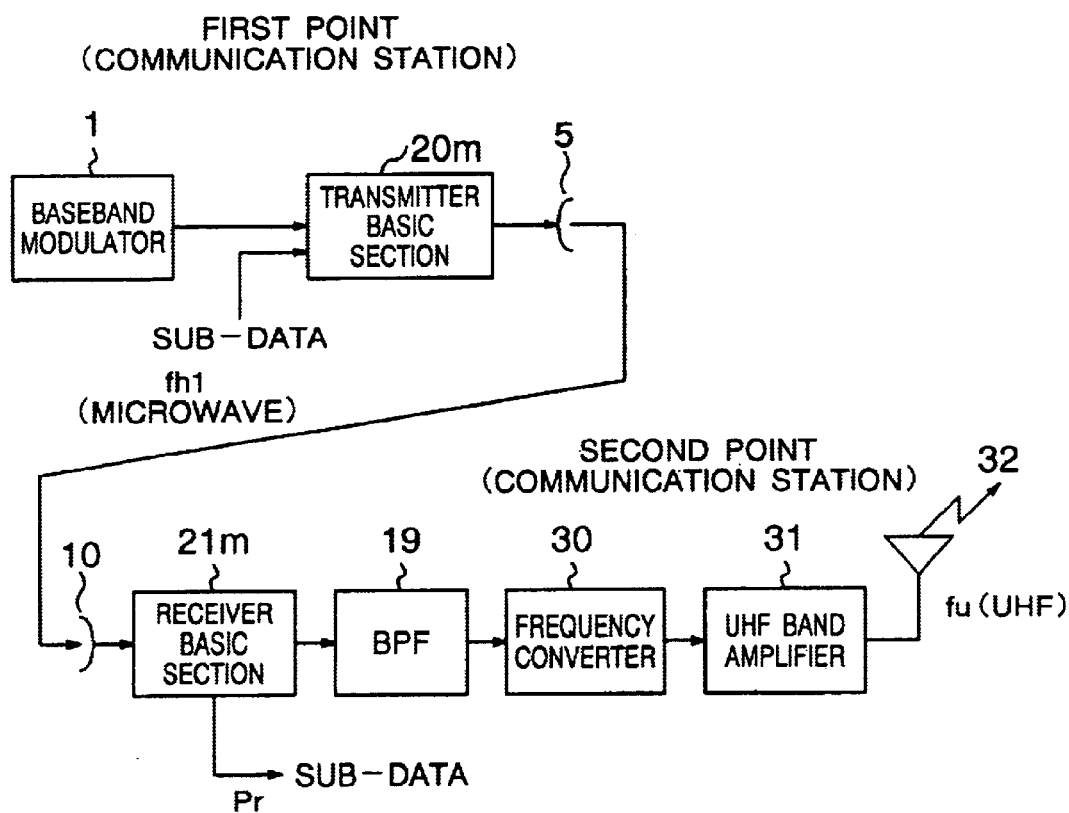
FIG. 10 is a block diagram of an STL to which the data transmission system of the present invention is applied.

Next FIG. 10 shows a block diagram of yet another embodiment of the data transmission system in accordance with the present invention. In the system of the embodiment of FIG. 10, a communication station corresponding to the second point in the embodiment of FIG. 6 does not perform relay transmission to a third point. The communication station as a second point, after receiving a microwave signal from a first point (communication station), converts the received signal to a UHF electromagnetic wave signal and then transmits it to an associated subscriber.

FIG. 10 shows an example of a studio-to-transmitter link (STL) of transmitting a signal in the form of microwave and then transmitting the signal having a UHF band frequency to general homes. In order to completely remove sub-data, the signal is passed through a BPF 19 to obtain only a main data component, frequency-converted by a frequency converter 30 to a signal having the UHF band frequency, amplified by a UHF band amplifier 31 to an output of a large to intermediate level, and then transmitted from an antenna 32 in the form of broadcasting wave.

It goes without saying that the present invention is not limited to the foregoing embodiments mentioned above. The pilot signal, that is, the sub-signal modulated with the sub-data in the present invention may have a frequency that is higher or lower than the band of the main signal. Further, the baseband modulator may employ a digital modulation system other than the OFDM modulation system or an analog modulation system. Data to be transmitted in the data transmission system of the present invention are considered to TV broadcasting signals or signals indicative of various media information other than the broadcasting signals. The signal transmission between the communication stations or between the communication and relay stations may be realized not only by the radio transmission but also by wired communication medium including an optical fiber cable.

As has been explained in the foregoing, in accordance with the present invention, since the reference frequency in the receiver side is controlled on the basis of the pilot frequency extracted in the receiver side, the frequency conversion reference of the transmission side can be made to coincide with that of the receiver side. At the same time, there can be realized a transmission system which can transmit sub-data while eliminating the need for provision of an additional channel for the sub-data.

What is claimed is:

1. A communication station in a data transmission system for transmitting data between communication stations located away from each other, comprising;

a transmitter having circuits for transmitting together a main signal having a carrier modulated with main data to be transmitted and a sub-signal having frequency information to be used to conduct frequency conversion at a receiver of another communication station, said sub-signal being generated by modulating a carrier having a predetermined frequency outside of a frequency band of said main signal with sub-data different from said main data;

a receiver having a circuit for receiving a receive signal from a transmitter of another communication station and extracting a sub-signal from said receive signal and a circuit for generating a reference signal when conducting frequency conversion of said receive signal to a signal of a predetermined frequency based on frequency information included in the extracted sub-signal; and a second transmitter for receiving the receive signal from the transmitter of another communication station, converting the received signal to a signal of a frequency band lower than the receive signal and transmitting the converted signal.

2. A communication station as set forth in claim 1, wherein said main signal includes a digital television signal and a digital audio signal.

3. A communication station as set forth in claim 1, wherein said sub-signal has a frequency that is outside of the frequency band of said main signal and offset therefrom by a predetermined frequency.

4. A communication station as set forth in claim 1, wherein said sub-data contains a voice signal.

* * * * *